J. D. BELL.
ROCKING COASTER.
APPLICATION FILED AUG. 24, 1917.
1,317,475.
Patented Sept. 30, 1919.
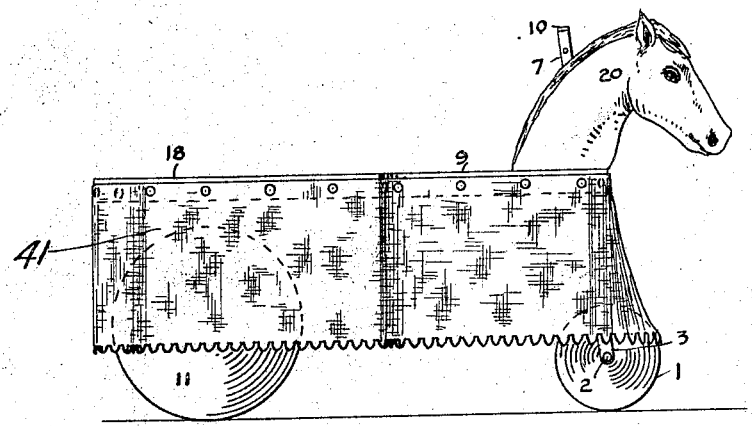
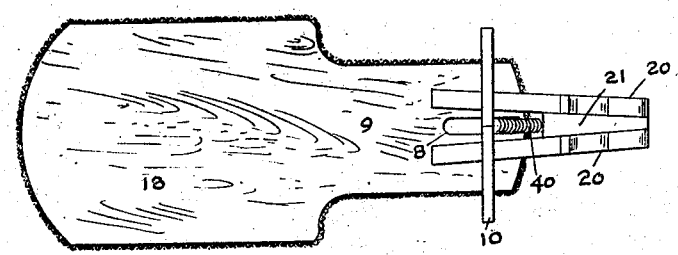
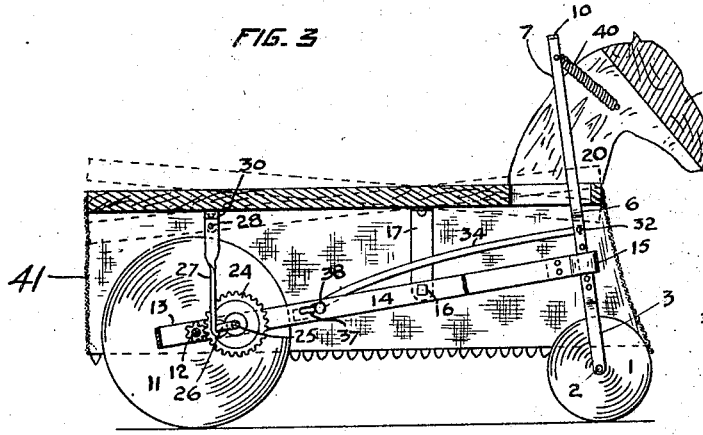
INVENTOR
JOSEPH D. BELL
BY *J. M. Wright,*
ATT'Y.

UNITED STATES PATENT OFFICE.

JOSEPH D. BELL, OF SAN FRANCISCO, CALIFORNIA.

ROCKING-COASTER.

1,317,475. Specification of Letters Patent. Patented Sept. 30, 1919.

Application filed August 24, 1917. Serial No. 187,971.

*To all whom it may concern:*

Be it known that I, JOSEPH D. BELL, a citizen of the United States, residing at San Francisco, in the county of San Francisco and State of California, have invented new and useful Improvements in Rocking-Coasters, of which the following is a specification.

The object of the present invention is to provide a child's coaster of which the seat will vibrate vertically so as to produce in the rider the sensation of riding on a trotting horse.

In the accompanying drawing, Figure 1 is a side view of the coaster; Fig. 2 is a plan view thereof; Fig. 3 is a longitudinal section thereof; Fig. 4 is a bottom plan view thereof; Fig. 5 is an end view.

Referring to the drawing, 1 indicates a front wheel, the axle 2 of which is mounted in fork members 3, the upper ends of which are secured on opposite sides of the lower end of a round rod 4, to the upper end of which rod, on opposite sides thereof, are pivoted fork members 6, the upper ends of which are brought together and form a steering bar 7, passing through a longitudinally extending slot 8 in a seat frame 9, the upper ends of said steering rod being bent transversely outward at right angles to the steering rod and in line with each other to form steering handles 10.

The rear wheels 11 are secured to a rear axle 12 journaled in side members 13 of a triangular frame 14, the forward narrow end of which forms a bearing 15 for the rod 4, between the upper end of the fork members 3, upon which it rests and the lower ends of the fork members 6. Pivotally connected, as shown at 16, to said side members 13, are the lower ends of upright bars 17, the upper ends of which are bent inwardly and secured to the under side of the seat frame 9, of which the rear portion is wider than the front portion to form a seat 18, while upon the front portion of the seat frame, on opposite sides of the slot 8 and the steering bar 7, are secured the lower edges of pieces of board 20, between the front portions of which is secured an intermediate piece 21, said pieces having a contour bearing a general resemblance to that of a horse's head. To the rear axle 12 is secured a pinion 23 which meshes with a gear wheel 24 fast on a crank shaft 25, the ends of which are journaled in the side members 13 and which have two U-cranks 26 extending in the same direction from the axis of the crank shaft and around which U-cranks are secured the lower ends of links 27, the upper ends of which are pivotally secured, as shown at 28, to the vertical members 29 of angular brackets 30, the horizontal members of which are secured by screws 31 to the underside of the seat.

It is evident that, by reason of this construction, the rotary movement of the rear wheels will impart a vertical rocking motion to the seat about a horizontal axis through the pivots of the upright bars 17 so that the rider will experience a sensation somewhat similar to that of riding on a trotting horse, except that the motion will be much more easy and gentle than that caused by the trotting action of the horse, and therefore better adapted to a child's size and strength.

Between the forks of said steering handle, at a short distance from the pivot, extends a pin 32 which passes through a hole 33 in the front end of a brake rod 34, through which, near its rear end, extends a pin 36 which can slide in a longitudinal slot 37 formed in one of the side members 13 of the main frame, said pin having a head 38 sliding against an inner surface of said side member 13 to retain the pin in the slot. The rear end 39 of said brake rod is bent at right angles and extends closely adjacent to the periphery of the adjacent rear wheel.

When the rider wishes to check the speed of the machine he pulls upon the steering handles 10 which has the effect of pressing the brake 39 formed by the bent end of the brake rod against the adjacent rear wheel.

The rear end of a coiled spring 40 is secured to the steering bar and its front end to the representation of the horse's head and returns the steering bar to its normal position and frees the brake from the rear wheel when the pull upon the steering handles has ceased.

An apron 41 is secured to, and depends from, the edge of the seat frame 9 and conceals the mechanism of the device.

I claim:

1. A rocking coaster comprising rear wheels, a shaft rotating with said wheels, a main frame in which said shaft is journaled, a seat mounted to rock about a horizontal axis, means whereby the rotary motion of said rear wheels produces a rocking motion of said seat, a steering bar having a forked lower end, a front wheel, a fork between the members of which the axle of the front wheel is journaled, the forked lower end of the steering bar being pivoted to the upper end of the last-named fork, a brake rod, the front end of which is pivoted to said steering bar, the rear end of which is bent transversely and suitably guided adjacent to one of the rear wheels to form a brake therefor.

2. In a velocipede, a plurality of wheels therefor, a seat, shafts connected to said wheels, a gear wheel connected to one of said shafts, a crank shaft, a second gear wheel carried thereby and meshing with the first-named gear wheel, whereby the crank shaft is operated by the revolution of the first-named shaft, upright arms connected with the crank shaft and supporting the seat of the velocipede, said arms being so connected with the crank shaft that the revolution of the latter vibrates the seat, a frame depending from the seat and sloping from the front to rear, and a front guiding wheel arranged to turn and run under the fore part of said frame.

3. In a velocipede, a plurality of wheels therefor, a seat, a shaft connected to said wheels, a gear wheel connected to said shaft, a crank shaft, a second gear wheel carried thereby and meshing with the first-named gear wheel, whereby the crank shaft is operated by the revolution of the first-named shaft, upright arms connected with the crank shaft and supporting the seat of the velocipede, said arms being so connected with the crank shaft that the revolution of the latter vibrates the seat, a frame depending from the seat and sloping from the front to rear, a front guiding wheel arranged to turn and run under the fore part of said frame, a steering post flexibly connected to said frame and guiding wheel, and a brake operatively connected to said steering post.

4. In a rocking coaster, the combination of a flat wooden board having a rear wide portion to form a seat, and a front portion which is narrower than the rear portion to permit of the rider conveniently placing his feet upon the ground, rear wheels for supporting the board and located near the marginal portions of the wide portion of the seat, a shaft secured to said rear wheels, a metallic frame having a wide rear portion, and a narrow front portion, the sides of said frame extending between the wheels and closely adjacent respectively thereto, uprights so supporting said board and supported by the narrow portion of the frame that the board can have a rocking motion about a transverse horizontal axis, a front wheel supporting the front end of said frame, a pinion centrally secured to said shaft, a central gear wheel meshing with said pinion, a crank shaft the ends of which are rotatably mounted in said frame in front of said wheel shaft and to which said gear wheel is secured and having U-cranks adjacent to the sides of said frame, and pitmen respectively connected at their lower ends with said cranks, and at their upper ends with said board.

JOSEPH D. BELL.

Copies of this patent may be obtained for five cents each, by addressing the "Commissioner of Patents, Washington, D. C."